(12) United States Patent
Zhao et al.

(10) Patent No.: US 12,539,086 B2
(45) Date of Patent: Feb. 3, 2026

(54) METHOD, APPARATUS AND SYSTEM FOR FILTERING PULSE SIGNAL MOTION INTERFERENCE

(71) Applicant: KINGFAR INTERNATIONAL INC., Beijing (CN)

(72) Inventors: Qichao Zhao, Beijing (CN); Ran Yang, Beijing (CN); Zhao Li, Beijing (CN)

(73) Assignee: KINGFAR INTERNATIONAL INC., Beijing (CN)

( * ) Notice: Subject to any disclaimer, the term of this patent is extended or adjusted under 35 U.S.C. 154(b) by 129 days.

(21) Appl. No.: 18/497,950

(22) Filed: Oct. 30, 2023

(65) Prior Publication Data

US 2024/0206820 A1 Jun. 27, 2024

(30) Foreign Application Priority Data

Dec. 23, 2022 (CN) .......................... 202211665739.5

(51) Int. Cl.
*A61B 5/00* (2006.01)
*A61B 5/024* (2006.01)
*A61B 5/0295* (2006.01)

(52) U.S. Cl.
CPC .......... *A61B 5/721* (2013.01); *A61B 5/02427* (2013.01); *A61B 5/0295* (2013.01); *A61B 5/725* (2013.01); *A61B 5/7278* (2013.01)

(58) Field of Classification Search
CPC ............ Y02B 20/40; A61B 2562/0219; A61B 5/02416; A61B 5/02427; A61B 5/02438;
(Continued)

(56) References Cited

U.S. PATENT DOCUMENTS

| | | |
|---|---|---|
| 2017/0325698 A1 | 11/2017 | Allec et al. |
| 2018/0085069 A1 | 3/2018 | Murali et al. |

(Continued)

FOREIGN PATENT DOCUMENTS

| | | |
|---|---|---|
| CN | 105943014 | 9/2016 |
| CN | 106691425 | 5/2017 |

(Continued)

OTHER PUBLICATIONS

Extended European Search Report, issued in the corresponding European patent application No. 23204034.5, dated Mar. 27, 2024, 7 pages.

(Continued)

*Primary Examiner* — Mark D Remaly
(74) *Attorney, Agent, or Firm* — HSML P.C.

(57) ABSTRACT

The present disclosure provides a method, an apparatus and a system for filtering pulse signal motion interference. The method comprises: irradiating a skin of a target human body in motion with a green light source in real time, so as to acquire a corresponding pulse signal from the target human body in real time; preprocessing the acquired pulse signal; and adaptively filtering the preprocessed pulse signal based on acceleration data of the target human body acquired in real time, so as to filter out a motion artifact interference of the pulse signal. The present disclosure can effectively improve the accuracy and effectiveness of filtering the pulse signal motion interference of a person in motion without a large amount of data, with a simple calculation process and without a plurality of PPG sensors, and can effectively improve the real-time performance for filtering the pulse signal motion interference.

8 Claims, 4 Drawing Sheets

(58) Field of Classification Search
CPC ....... A61B 5/0295; A61B 5/681; A61B 5/721; A61B 5/7214; A61B 5/725; A61B 5/7278
See application file for complete search history.

(56) References Cited

U.S. PATENT DOCUMENTS

2019/0192079 A1   6/2019   Groenendaal et al.
2020/0305798 A1   10/2020  Ishikawa et al.

FOREIGN PATENT DOCUMENTS

| CN | 108937878 | 12/2018 |
| CN | 113476024 | 10/2021 |

OTHER PUBLICATIONS

First Office Action and Search Report, issued in the corresponding Chinese patent application No. 202211665739.5, dated May 25, 2025, 16 pages with the English translation.

METHOD, APPARATUS AND SYSTEM FOR FILTERING PULSE SIGNAL MOTION INTERFERENCE

This application claims priority to Chinese Patent Application No. 202211665739.5, filed on Dec. 23, 2022, which is hereby incorporated by reference in its entirety.

TECHNICAL FIELD

The present disclosure relates to the technical field of pulse signal processing, and particularly to a method, an apparatus and a system for filtering pulse signal motion interference.

BACKGROUND

The photoplethysmography (PPG) signal is mostly used for heart rate (HR) monitoring and is a key technology for many existing wearable products and clinical devices. In order to obtain this signal, LEDs are used to illuminate the human skin, and then a photodiode is used to measure the change in the intensity of reflected light caused by a blood flow. The morphology of the pulse signal is similar to the waveform of the arterial blood pressure (ABP), and may be used for noninvasive heart rate monitoring. The periodicity of the pulse signal is corresponding to the heart rhythm. Thus, the heart rate may be estimated from the pulse signal. However, due to the influences of the poor blood perfusion, the ambient light and most importantly, the motion artifact (MA), the performance of heart rate estimation is degraded. Therefore, many research institutions and companies have carried out a lot of designs and researches on the noise interference of the pulse signal. Since the motion artifact is the biggest noise interference source of PPG signal wearable devices, it also becomes the core issue of the current researches together with the ambient light.

At present, the existing methods for filtering pulse signal interferences include: a method based on a non-motion reference system, a method that introduces motion information of a motion sensor as a noise signal source, a method based on an artificial neural network, a method of using multi-channel PPG sensors, a method for feature extraction by variance discrimination, a general frame algorithm of heart rate monitoring, etc. However, any of the above methods has at least one of the following problems: a large amount of data is required, the calculation process is complicated, a large number of PPG sensors are used, only static data can be measured, and only post-processing is possible.

SUMMARY

In view of the above problems, the embodiments of the present disclosure provide a method, an apparatus and a system for filtering pulse signal motion interference, so as to eliminate or mitigate one or more defects in the prior art.

An aspect of the present disclosure provides a method for filtering pulse signal motion interference, comprising:
 irradiating a skin of a target human body in motion with a green light source in real time, so as to acquire a corresponding pulse signal from the target human body in real time;
 preprocessing the acquired pulse signal; and
 adaptively filtering the preprocessed pulse signal based on acceleration data of the target human body acquired in real time, so as to filter out a motion artifact interference of the pulse signal.

In some embodiments of the present disclosure, irradiating a skin of a target human body in motion with a green light source in real time, so as to acquire a corresponding pulse signal from the target human body in real time comprises:
 controlling a PPG sensor to irradiate the skin of the target human body currently in motion with the green light source in real time, and acquiring a corresponding pulse signal in real time.

In some embodiments of the present disclosure, preprocessing the acquired pulse signal comprises:
 removing baseline data and high-frequency noise from the acquired pulse signal respectively.

In some embodiments of the present disclosure, removing baseline data and high-frequency noise from the acquired pulse signal respectively comprises:
 controlling an infinite impulse response filter to perform high-pass filtering processing on the acquired pulse signal to remove the baseline data in the pulse signal, and perform low-pass filtering processing on the pulse signal to remove the high-frequency noise in the pulse signal.

In some embodiments of the present disclosure, before adaptively filtering the preprocessed pulse signal based on acceleration data of the target human body acquired in real time, so as to filter out a motion artifact interference of the pulse signal, the method further comprises:
 controlling an acceleration sensor to acquire the acceleration data of the target human body in real time.

In some embodiments of the present disclosure, adaptively filtering the preprocessed pulse signal based on acceleration data of the target human body acquired in real time, so as to filter out a motion artifact interference of the pulse signal comprises:
 determining an estimated value of a blood volume change of the target human body due to motion, based on the acceleration data of the target human body acquired in real time; and
 subtracting the estimated value of the blood volume change from a value corresponding to the preprocessed pulse signal, so as to filter out a motion artifact interference of the pulse signal and obtain a corresponding target pulse signal.

Another aspect of the present disclosure provides an apparatus for filtering pulse signal motion interference, comprising:
 a signal acquisition module configured to irradiate a skin of a target human body in motion with a green light source in real time, so as to acquire a corresponding pulse signal from the target human body in real time;
 a preprocessing module configured to preprocess the acquired pulse signal; and
 an interference filtering module configured to adaptively filter the preprocessed pulse signal based on acceleration data of the target human body acquired in real time, so as to filter out a motion artifact interference of the pulse signal.

A third aspect of the present disclosure provides a system for filtering pulse signal motion interference, comprising: a micro-control unit, and a PPG sensor, an infinite impulse response filter and an acceleration sensor which are in communication connections with the micro-control unit respectively;
 the micro-control unit is configured to perform the aforementioned method for filtering pulse signal motion interference;

the micro-control unit controls the PPG sensor to irradiate a skin of a target human body in motion with a green light source in real time, so as to acquire a corresponding pulse signal from the target human body in real time;

the micro-control unit controls the infinite impulse response filter to remove baseline data and high-frequency noise in the acquired pulse signal respectively; and the micro-control unit controls the acceleration sensor to acquire acceleration data of the target human body in real time.

A fourth aspect of the present disclosure provides an electronic device, comprising a memory, a processor and a computer program stored in the memory and runnable on the processor, wherein when the processor executes the computer program, the aforementioned method for filtering pulse signal motion interference is realized.

A fifth aspect of the present disclosure provides a computer-readable storage medium having a computer program stored thereon, wherein when the computer program is executed by a processor, the aforementioned method for filtering pulse signal motion interference is realized.

The method for filtering pulse signal motion interference according to the present disclosure irradiates a skin of a target human body in motion with a green light source in real time, so as to acquire a corresponding pulse signal from the target human body in real time; preprocesses the acquired pulse signal; and adaptively filters the preprocessed pulse signal based on acceleration data of the target human body acquired in real time, so as to filter out a motion artifact interference of the pulse signal. The present disclosure can effectively improve the accuracy and effectiveness of filtering the pulse signal motion interference of a person in motion without a large amount of data, with a simple calculation process and without a plurality of PPG sensors, and can effectively improve the real-time performance for filtering the pulse signal motion interference, thereby greatly improving the accuracy and reliability of the heart rate measurement performed based on the pulse signal with the motion interference filtered out.

Additional advantages, objectives and features of the present disclosure will be partially set forth in the description below, and partially apparent to those of ordinary skill in the art upon examination of the following content, or may be learned from the practice of the present disclosure. The objectives and other advantages of the present disclosure can be realized and attained by the structure particularly pointed out in the specification and the drawings.

It will be appreciated by those skilled in the art that the objectives and advantages that can be achieved by the present disclosure are not limited to those specifically described above, and the above and other objectives that can be achieved by the present disclosure will be more clearly understood from the following detailed description.

BRIEF DESCRIPTION OF THE DRAWINGS

The drawings described here provide a further understanding of the present disclosure and constitute a part thereof, rather than limiting the present disclosure. The parts in the drawings are not drawn to scale, but merely to illustrate the principles of the present disclosure. In order to facilitate the illustration and description of some parts of the present disclosure, corresponding parts in the drawings can be enlarged, that is, they may become larger than other parts in the exemplary apparatus actually manufactured according to the present disclosure. In the drawings.

DETAILED DESCRIPTION OF THE PREFERRED EMBODIMENTS

Figure 1:
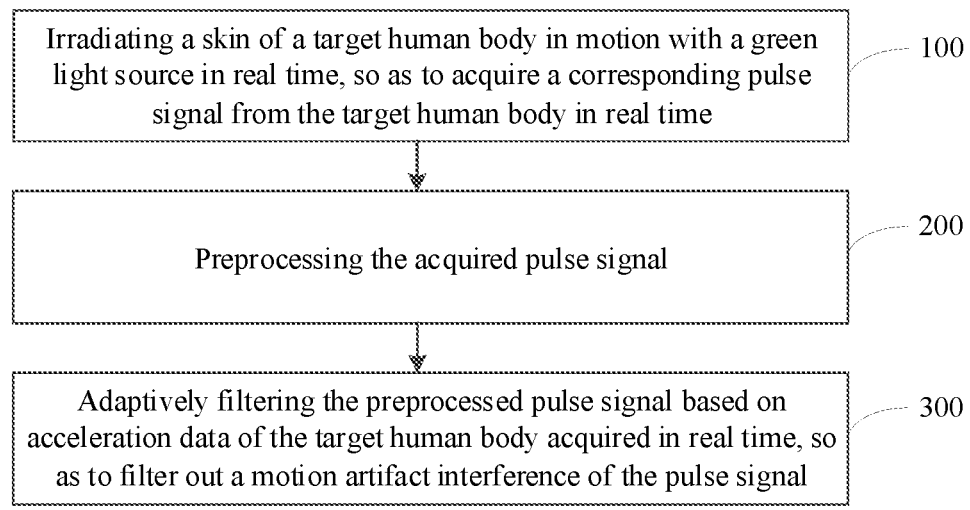
FIG. 1 is a first flowchart of a method for filtering pulse signal motion interference according to an embodiment of the present disclosure.

In order that the objectives, technical solutions and advantages of the present disclosure are clearer, the present disclosure will be further described in detail with reference to the embodiments and the drawings. Here, the exemplary embodiments of the present disclosure and the description thereof are used to explain the present disclosure, rather than being limitations thereto.

It should also be noted that in order to avoid the present disclosure from being obscured by unnecessary details, only the structures and/or processing steps closely related to the solutions according to the present disclosure are illustrated in the drawings, and other details not so related to the present disclosure are omitted.

It should be emphasized that the term 'comprise/include' used herein refers to the presence of features, elements, steps or components, but does not exclude the presence or addition of one or more other features, elements, steps or components.

It should also be noted that unless otherwise specified, the term 'connection' used herein refers to not only a direct connection, but also an indirect connection with an intermediate.

Hereinafter, the embodiments of the present disclosure will be described with reference to the drawings, in which the same reference numerals represent the same or similar parts, or the same or similar steps.

In one or more embodiments of the present disclosure, an infinite impulse response (IIR) filter has the characteristics of simple structure, small amount of computation and the like, and is very suitable for digital signal front-end processing of an embedded system.

In one or more embodiments of the present disclosure, ACC data refers to acceleration data, which may be measured by an acceleration sensor.

In one or more embodiments of the present disclosure, a PPG sensor is a photoelectric sensor for monitoring cardiovascular vital signs, and usually works by means of transmission or reflection. The PPG sensor consists of at least a pair of light emitting diodes (LEDs) which illuminate a skin as a light source, and a photodetector (PD) which detects the remaining transmitted or reflected light (another part of the incident light is absorbed by blood and tissues during penetration). Due to the change of the arterial blood volume during cardiac activity, the intensity of the PD transmitted or reflected light varies with the arterial pulsation, and then is converted into an electrical signal by the PD. The pulse signal contains an alternating current (AC) component and a direct current (DC) component, and is produced due to the light absorption by pulsating blood and non-pulsating tissues. A heart rate, a blood oxygen saturation and a blood pressure may be obtained based on the pulse signal produced by the light absorption by pulsating blood and non-pulsating tissues.

The PPG sensors are mainly sorted into reflective and transmissive types, and the signal obtained by the reflective PPG sensor is relatively weak. The light source of the reflective PPG sensor needs to pass through skin, muscles, capillaries and other tissues before returning to the skin surface to be finally received by the sensor. Therefore, the reflective PPG sensor is more susceptible to the motion artifact. According to the existing literatures, there are two conventional methods to eliminate the motion artifact. One method is based on a non-motion reference system, and it extracts information such as a heart rate from a distorted pulse wave signal based on a main frequency of the extracted pulse wave signal. The other method is to introduce motion information of a motion sensor as a noise signal source. For example, the motion components are taken as the characteristic parameters of the motion artifact, so as to actively eliminate the noise contribution using a filter optimization algorithm. At present, many related methods have been proposed to eliminate the motion artifact in the pulse signal. However, in order to well eliminate the motion artifact, both a good algorithm and a proper design of the photoelectric sensor are required, and it is necessary to select the incident light with a corresponding wavelength as needed, so as to enhance the signal-to-noise ratio as much as possible while meeting the needs.

At present, it is still difficult to reduce the motion artifact of the pulse signal, so the extensive researches have been carried out in this field. Some scholars use a method based on an artificial neural network to identify finger pulse signals containing motion artifacts. Since this method needs a large number of clean pulse signals to train the ANN in advance and requires producing a separate reference pulse template for each subject, the universality of this method should be further improved. Some scholars have carried out researches on the sensor itself using a nine-channel PPG sensor and a truncated singular value decomposition algorithm, so as to estimate the pulse signals of the subjects during high-intensity motion.

In addition, some scholars have made a reflective pulse signal acquisition system, which adopts a variance discrimination method to extract features of the motion artifact of the pulse signal based on a wearable apparatus, and then calculates the physiological parameters such as blood oxygen saturation of the pulse signal. This method has been proved to have certain accuracy, but it only aims at a static measurement and does not filter the motion artifact of a moving subject. Some scholars have proposed a universal frame algorithm for heart rate monitoring, called TROIKA, which uses a variety of algorithms to remove noise signals. The frame has a checked estimation accuracy and robustness against motion artifacts, wherein the average error of the heart rate estimation is 2.34 times per minute, and the Pearson correlation with the actual heart rate reaches 0.992, which has good adaptability, but the calculation process is complicated.

Therefore, in view of at least one of the problems of the existing filtering of the pulse signal motion interference, i.e., a large amount of data is required, the calculation process is complicated, a large number of PPG sensors are used, only static data can be measured, only post-processing is possible, and it is inapplicable for the micro-control unit MCU, the present disclosure can filter out the ambient light, the baseline data, the high-frequency noise and the motion artifact interference, eliminate the motion artifact during a strenuous motion, be suitable for real-time processing during the data acquisition, and be suitable for processing using the MCU (i.e., the micro control unit mentioned in the subsequent embodiments of the present disclosure).

The detailed description is given through the following embodiments.

An embodiment of the present disclosure provides a method for filtering pulse signal motion interference. Referring to FIG. 1, the method for filtering pulse signal motion interference that can be performed by an apparatus for filtering pulse signal motion interference specifically includes:

step 100: irradiating a skin of a target human body in motion with a green light source in real time, so as to acquire a corresponding pulse signal from the target human body in real time.

Figure 2A:
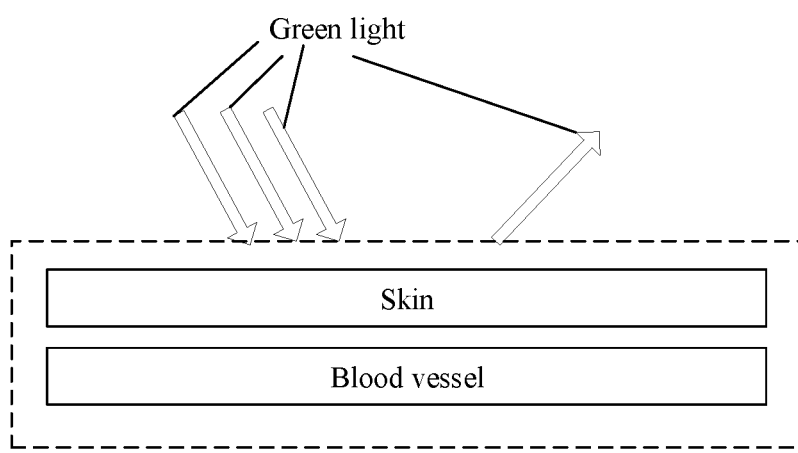
FIG. 2A is a schematic diagram of an absorption rate of a green light source irradiating a human skin.
Figure 2B:
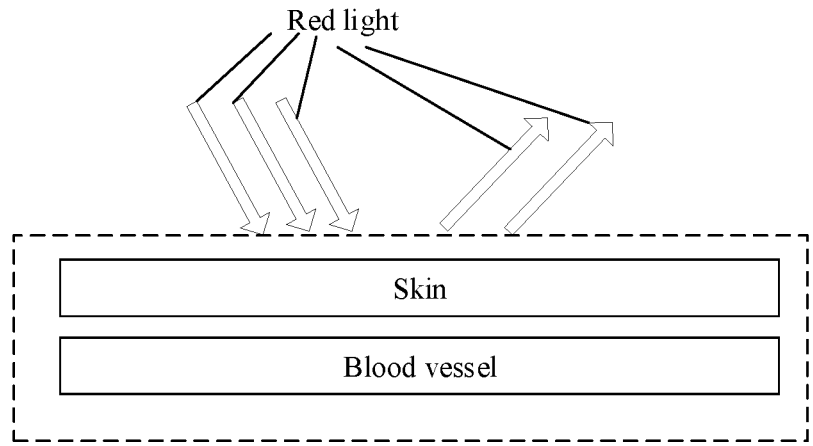
FIG. 2B is a schematic diagram of an absorption rate of a red light source irradiating a human skin.
Figure 3A:
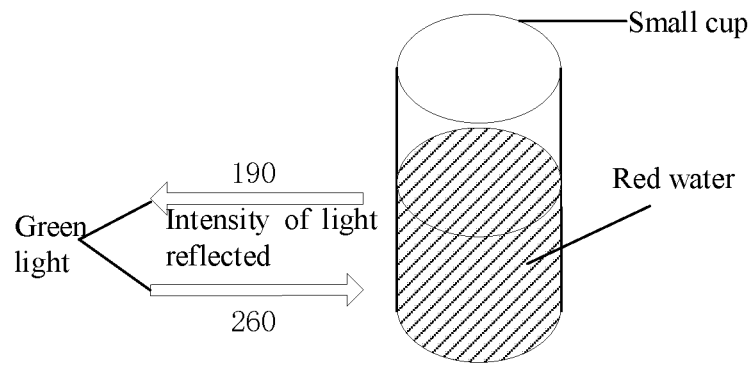
FIG. 3A is a schematic diagram of the intensity of light reflected by a small cup of red water irradiated by a green light source.
Figure 3B:
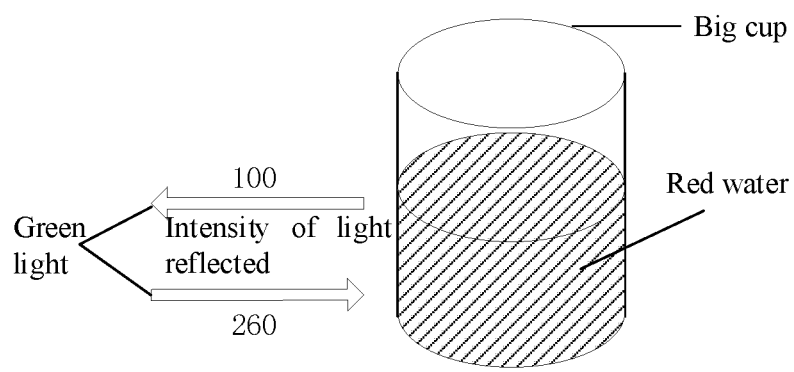
FIG. 3B is a schematic diagram of the intensity of light reflected by a big cup of red water irradiated by a green light source.
Figure 3C:
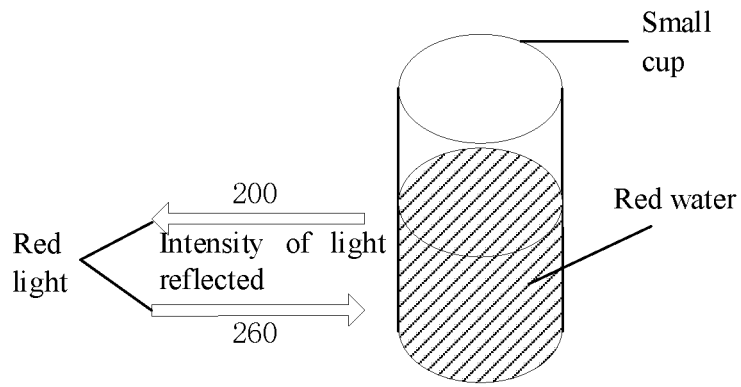
FIG. 3C is a schematic diagram of the intensity of light reflected by a small cup of red water irradiated by a red light source.
Figure 3D:
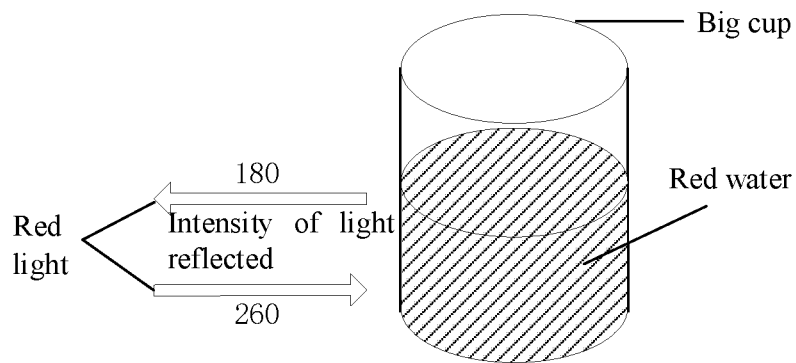
FIG. 3D is a schematic diagram of the intensity of light reflected by a big cup of red water irradiated by a red light source.

As can be appreciated, referring to FIGS. 2A and 2B, green light is selected as the light source because human's skin color is mainly caused by melanin and varied with the melanin content. Melanin absorbs green light well, but it is basically transparent to red light. In addition, hemoglobin in the blood has a high absorption rate of green light. So generally speaking, the human body has a high absorption rate of green light, which is the reason why no one's skin is green, because the green light is fully absorbed by the human body and cannot be reflected into eyes of the human. On the other hand, the absorption rate of red light or infrared light by the human body is much lower.

In which, referring to FIGS. 3A to 3D, the advantages of using the green light source are as follows:

(1) The Signal Amplitude is Large

When the same intensity of green light is emitted into a big cup and a small cup of red water, since the red water has a high absorption rate of green light, the intensities of light reflected back by different volumes of water are quite different.

However, when the same intensity of red light is emitted into a big cup and a small cup of red water, since the red water has a low absorption rate of red light, the intensities of light reflected back by different volumes of water are less different.

Now it is imagined that the blood vessels are the water mentioned above, and the volume of water increases or decreases as the heart beats. If the incident light is green, the reflected light caused by the heart beat changes greatly; and if the incident light is red, the reflected light caused by the heart beat changes little. In other words, the signal obtained with green light will change more than the signal obtained with red light.

(2) The Influence of Ambient Light is Small

The sensor that detects the intensity of light receives the reflected light of the emitted light and the reflected light of the ambient light. If green light is used, with the sensor that detects green light, the green component of the ambient light is almost absorbed by the human body, and the light reflected onto the sensor can be ignored. In case of red light ((infrared light), since the human body absorbs less red light (infrared light), the red (infrared) component of the ambient light will still be partially reflected onto the sensor, thereby interfering with the effective signal. Therefore, the capability to resist the influence of the ambient light is better with green light than with red light.

As can be seen from the above two points, the green light signal has large amplitude and low noise, i.e., a high signal-to-noise ratio.

When the signal-to-noise ratio is high, the detection is easy and the influences of some interferences (the bracelet/watch does not fit, the human body is in motion, etc.) are little.

step 200: preprocessing the acquired pulse signal.

As can be appreciated, it is well known that the pulse signal is susceptible to the poor blood perfusion and the motion artifact in the peripheral tissues. In order to minimize the influence of these factors and avoid the subsequent PPG analysis and heart rate estimation from being interfered with, a preprocessing stage is needed. A band-pass filter may be used to eliminate the high-frequency component (e.g., the power supply) and the low-frequency component (e.g., the changes in capillary density and venous blood volume, the change in temperature, etc.) of the pulse signal.

step 300: adaptively filtering the preprocessed pulse signal based on acceleration data of the target human body acquired in real time, so as to filter out a motion artifact interference of the pulse signal.

As can be seen from the above description, the method for filtering pulse signal motion interference according to the embodiment of the present disclosure can effectively improve the accuracy and effectiveness of filtering the pulse signal motion interference of a person in motion without a large amount of data, with a simple calculation process and without a plurality of PPG sensors, and can effectively improve the real-time performance for filtering the pulse signal motion interference, thereby greatly improving the accuracy and reliability of the heart rate measurement performed based on the pulse signal with the motion interference filtered out.

Figure 4:
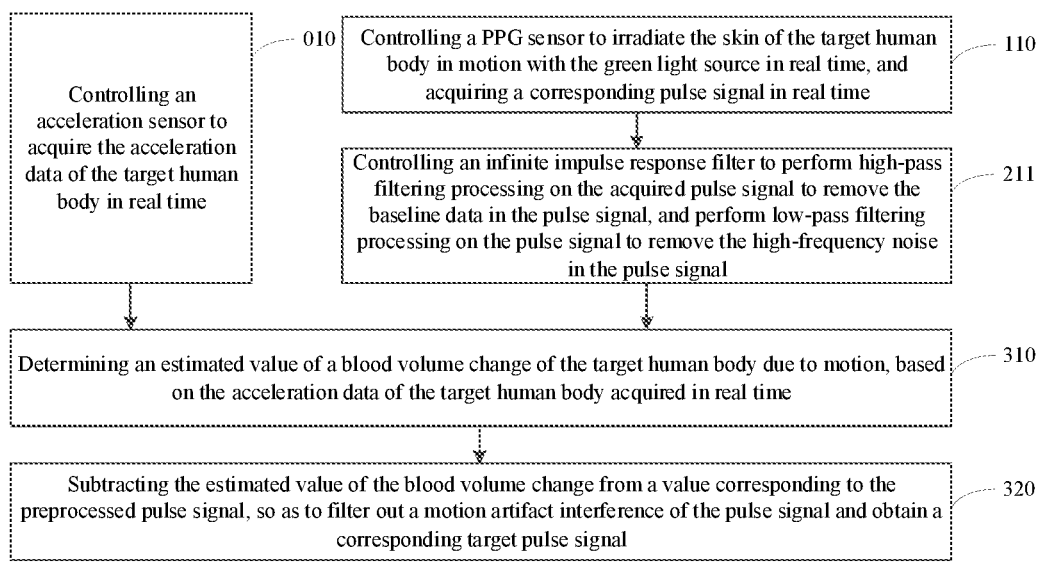
FIG. 4 is a second flowchart of a method for filtering pulse signal motion interference according to an embodiment of the present disclosure.

In order to further improve the effectiveness and reliability of removing the ambient light interference, referring to FIG. 4, step 100 in the method for filtering pulse signal motion interference specifically includes:

step 110: controlling a PPG sensor to irradiate the skin of the target human body in motion with the green light source in real time, and acquiring a corresponding pulse signal in real time.

That is, it is necessary to adjust the PPG sensor to adopt the green light source before step 100.

In order to further improve the effectiveness and reliability of preprocessing, in the method for filtering pulse signal motion interference according to the embodiment of the present disclosure, step 200 specifically includes:

step 210: removing baseline data and high-frequency noise from the acquired pulse signal respectively.

In order to further improve the effectiveness and reliability of high-pass filtering and low-pass filtering, referring to FIG. 4, step 210 in the method for filtering pulse signal motion interference according to the embodiment of the present disclosure specifically includes:

step 211: controlling an infinite impulse response filter to perform high-pass filtering processing on the acquired pulse signal to remove the baseline data in the pulse signal, and perform low-pass filtering processing on the pulse signal to remove the high-frequency noise in the pulse signal.

Specifically, an infinite impulse response (IIR) filter may be used to perform 1 hz high-pass filtering processing on the pulse signal to remove the baseline data. Next, the IIR filter performs 8 hz low-pass filtering processing to remove some high frequency noise.

In order to further improve the effectiveness and reliability of filtering the motion artifact interference of the pulse signal, referring to FIG. 4, before step 300, the method for filtering pulse signal motion interference according to the embodiment of the present disclosure specifically includes:

step 010: controlling an acceleration sensor to acquire the acceleration data of the target human body in real time.

In order to further improve the efficiency and reliability of filtering the motion artifact interference of the pulse signal, referring to FIG. 4, step 300 in the method for filtering pulse signal motion interference according to the embodiment of the present disclosure specifically includes:

step 310: determining an estimated value of a blood volume change of the target human body due to motion, based on the acceleration data of the target human body acquired in real time; and step 320: subtracting the estimated value of the blood volume change from a value corresponding to the preprocessed pulse signal, so as to filter out a motion artifact interference of the pulse signal and obtain a corresponding target pulse signal.

Specifically, the acceleration data is a value corresponding to an ACC signal, i.e., an ACC value, which may be denoted as x(n), where the ACC value is an acceleration change amount in each direction during real-time motion detection. Next, the blood volume change due to the motion is estimated through the ACC value, and then the interference can be removed by subtracting the value of the blood volume change due to the motion from the PPG value acquired in real time.

Figure 5:
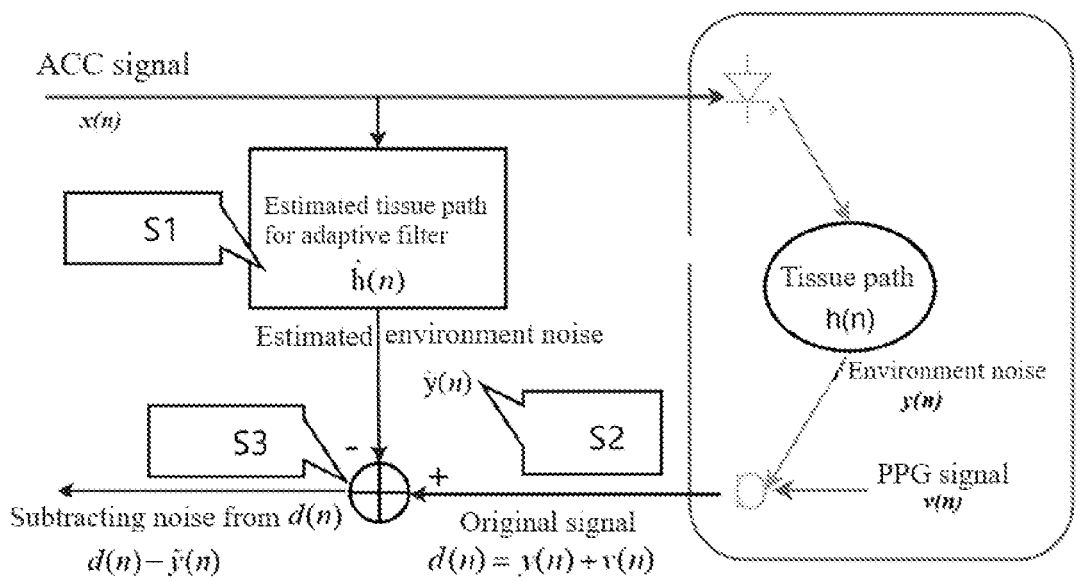
FIG. 5 is an exemplary schematic diagram of an execution logic of step 320 according to an embodiment of the present disclosure.

Referring to FIG. 5, step 320 may specifically include:

Taking a wrist sensor as an example, and when human shakes his arms, the acceleration ACC definitely changes because of a force transformation. Accordingly, the blood volume in the human body also varies with the force (the change in x(n)), and although their amplitudes are different, their frequencies are certainly the same.

Step S1: determining an adaptive filter coefficient w; that is, inputting the value x(n) of the ACC signal into an adaptive filter to obtain an estimated tissue path h(n);

Step S2: solving k(n); the signal to be finally removed is y(n), which indicates the blood volume change due to the ACC transformation, as shown in Formula (1):

$$\begin{cases} \hat{h}(n) = w(n) \\ w = [w(0), w(1), \ldots, w(N)]^T \\ \hat{y}(n) = \sum_{i=0}^{N-1} x(n-i) * w(i) = w^T x_n \end{cases} \quad (1)$$

In formula (1), $x_n$ represents a filter of order N; $w^T$ represents far-end inputs of N moments at and before moment n, which is weighted by w to obtain a noise signal estimation at moment n, and the purpose of the whole system is to obtain the filter w.

In order to imitate y(n), fir adaptive filtering is adopted to modify the parameter w in real time to convolve with the acceleration x(n), thereby obtaining an estimated value of y(n), that is, according to formula (1) and the estimated tissue path $\hat{h}(n)$, it is possible to calculate the blood volume change due to the motion, namely, the motion artifact or the estimated motion noise $\hat{y}(n)$.

Step S3: solving the clean pulse signal based on formula (2); since d(n) is the original pulse signal mixed with noise and the environment noise y(n) has been estimated with $\hat{y}(n)$, finally $\hat{v}(n)=d(n)-\hat{y}(n)$. The final PPG ($\hat{v}(n)$) is calculated as:

$$\begin{cases} J_{min}(w_n) = E\{|d(n) - \hat{y}(n)|^2\} = E\{|d(n) - w_n^T x_n|^2\} \\ \hat{v}(n) = e(n) = d(n) - \hat{y}n = d(n) - w_n^T x_n \end{cases} \quad (2)$$

In formula (2), $J_{min}(w_n)$ represents an LNS optimization function; $\hat{v}(n)$ represents an final output; d(n) represents an original photoelectric volume signal containing noise, $\hat{y}(n)$ represents an estimation of the blood volume change due to the ACC change, and the whole E is to calculate a mathematical expectation. $w_n^T x_n$ is a representation of linear algebra in a normal process of solving $\hat{y}(n)$. $\hat{y}(n)$ is value roughly estimated by adaptive filtering h(t). That is, y(n) cannot be acquired, but $\hat{y}(n)$ is an estimation of y(n), and the subsequent calculations may adopt $\hat{y}(n)$.

Figure 6:
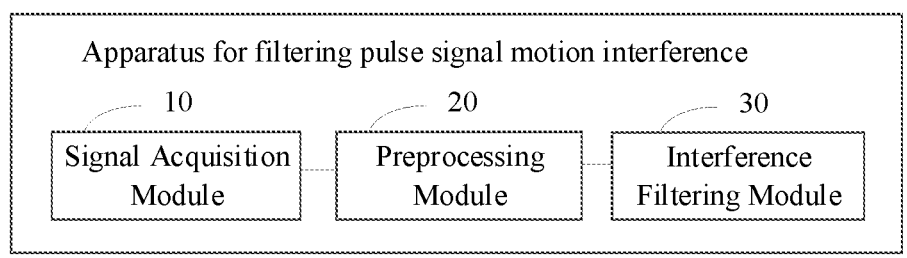
FIG. 6 is a schematic structural diagram of an apparatus for filtering pulse signal motion interference according to another embodiment of the present disclosure.

From the perspective of software, based on the embodiments of the method for filtering pulse signal motion interference, the present disclosure further provides an apparatus for filtering pulse signal motion interference to implement the method for filtering pulse signal motion interference. Referring to FIG. 6, the apparatus for filtering pulse signal motion interference specifically includes:

a signal acquisition module 10 configured to irradiate a skin of a target human body in motion with a green light source in real time, so as to acquire a corresponding pulse signal from the target human body in real time.

a preprocessing module 20 configured to preprocess the acquired pulse signal; and an interference filtering module 30 configured to adaptively filter the preprocessed pulse signal based on acceleration data of the target human body acquired in real time, so as to filter out a motion artifact interference of the pulse signal.

The apparatus for filtering pulse signal motion interference according to the present disclosure can specifically perform the processing flow of the embodiment of the method for filtering pulse signal motion interference in the above embodiments, but its functions are not described here, and please refer to the detailed description of the method for filtering pulse signal motion interference in the above embodiments.

The filtering of pulse signal motion interference may be performed in a controller by the apparatus for filtering pulse signal motion interference, and may also be completed in a client device in another practical application situation, which may be selected according to the processing capacity of the client device and the limitations of the user's usage scenarios and is not limited herein. If all the operations are completed in the client device, the client device may further include a processor for the specific processing of filtering the pulse signal motion interference.

The client device may include a communication module (i.e., a communication unit) in a communication connection with a remote server to realize data transmission therewith. The server may include a server on a side of a task scheduling center, and in other implementation scenarios, it may also include a server of an intermediate platform, such as a server of a third-party server platform in a communication link with the server of the task scheduling center. The server may include a single computer device, or a server cluster composed of a plurality of servers, or a distributed server structure.

The communication between the server and the client device may adopt any suitable network protocol, including a network protocol that had not been developed at the filing date of the present disclosure. The network protocol may include, for example, a TCP/IP protocol, a UDP/IP protocol, an HTTP protocol, an HTTPS protocol, etc. Of course, the network protocol may also include, for example, a Remote Procedure Call (RPC) protocol and a Representational State Transfer (REST) protocol used based on the above protocols.

As can be seen from the above description, the apparatus for filtering pulse signal motion interference according to the embodiment of the present disclosure can effectively improve the accuracy and effectiveness of filtering the pulse signal motion interference of a person in motion without a large amount of data, with a simple calculation process and without a plurality of PPG sensors, and can effectively improve the real-time performance for filtering the pulse signal motion interference, thereby greatly improving the accuracy and reliability of the heart rate measurement performed based on the pulse signal with the motion interference filtered out.

Figure 7:
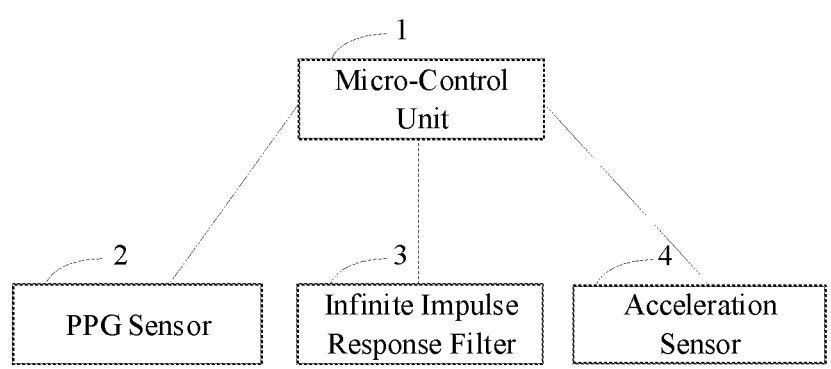
FIG. 7 is a schematic structural diagram of a system for filtering pulse signal motion interference according to another embodiment of the present disclosure.

From the perspective of software, based on the embodiments of the method for filtering pulse signal motion interference, the present disclosure further provides a system for filtering pulse signal motion interference as illustrated in FIG. 7, which specifically includes:

a micro-control unit 1, and a PPG sensor 2, an infinite impulse response filter 3 and an acceleration sensor 4 which are in communication connections with the micro-control unit 1 respectively;

the micro-control unit 1 is configured to perform the method for filtering pulse signal motion interference according to the aforementioned embodiments;

the micro-control unit 1 controls the PPG sensor 2 to irradiate a skin of a target human body in motion with a green light source in real time, so as to acquire a corresponding pulse signal from the target human body in real time;

the micro-control unit 1 controls the infinite impulse response filter 3 to remove baseline data and high-frequency noise in the acquired pulse signal respectively;

the micro-control unit 1 controls the acceleration sensor 4 to acquire acceleration data of the target human body in real time.

As can be seen from the above description, the system for filtering pulse signal motion interference according to the embodiment of the present disclosure can effectively improve the accuracy and effectiveness of filtering the pulse signal motion interference of a person in motion without a large amount of data, with a simple calculation process and without a plurality of PPG sensors, and can effectively improve the real-time performance for filtering the pulse signal motion interference, thereby greatly improving the accuracy and reliability of the heart rate measurement performed based on the pulse signal with the motion interference filtered out.

In order to weaken the interference of noise such as the motion artifact on the PPG waveform when the photoelectric sensor acquires the PPG data in real time, and to facilitate subsequent heart rate variability (HRV) processing of the PPG data, the present disclosure further provides a specific application example of the method for filtering pulse signal motion interference, which specifically includes:

(1) The Green Light Source is Selected

The green light signal has large amplitude and low noise, i.e., a high signal-to-noise ratio.

When the signal-to-noise ratio is high, the detection is easy and the influences of some interferences (the bracelet/watch does not fit, the human body is in motion, etc.) are little.

(2) The Motion Artifact is Removed while Data is Acquired

Although the PPG signal-to-noise ratio detected with green light is large, there are still inevitable motion artifacts when a subject is in motion. At this time, some algorithms are needed to filter the data.

1. High-Pass and Low-Pass Processing

An infinite impulse response (IIR) filter is used to perform 1 hz high-pass filtering processing on the pulse signal to remove the baseline data. Next, the IIR filter performs 8 hz low-pass filtering processing to remove some high frequency noise.

2. 1 ms Adaptive Filtering

In this step, the ACC data is needed to estimate the motion artifact.

First of all, it is needed to know what the motion artifact is. It is known that the green light detection mainly detects the relative difference signal of the blood volume in the human skin. When being tested, the subject is stationary, and it is measured that the overall volume of capillaries varies with the heartbeat. But if the subject is in motion, capillaries will be easily interfered with by the motion, such as a sudden change of the acceleration, and the blood is forced by surrounding human tissues to a certain extent, thereby changing the blood volume. In addition, with the sudden increase of the acceleration in the motion, some jewelry and device the subject wear will also exert forces on the surface of human skin, thereby leading to the blood volume change.

The ACC value is the acceleration change amount in each direction during real-time motion detection. The blood volume change due to the motion is estimated through the ACC value, and then the interference can be removed by subtracting the value of the blood volume change due to the motion from the PPG value acquired in real time.

In conclusion, the application example of the present disclosure can effectively improve the accuracy and effectiveness of filtering the pulse signal motion interference of a person in motion without a large amount of data, with a simple calculation process and without a plurality of PPG sensors, and can effectively improve the real-time performance for filtering the pulse signal motion interference, thereby greatly improving the accuracy and reliability of the heart rate measurement performed based on the pulse signal with the motion interference filtered out.

The embodiments of the present disclosure further provide an electronic device (i.e., a computer device), which may include a processor, a memory, a receiver and a transmitter. The processor is configured to perform the method for filtering pulse signal motion interference mentioned in the above embodiments, wherein the processor and the memory may be connected by a bus for example or by other means. The receiver may be connected to the processor and the memory in a wired or wireless way.

The processor may be a Central Processing Unit (CPU). The processor may also be any other general processor, a Digital Signal Processor (DSP), an Application Specific Integrated Circuit (ASIC), a Field-Programmable Gate Array (FPGA) or any other programmable logic device, a discrete gate or a transistor logic device, a chip such as a discrete hardware component, or combinations thereof.

As a non-transient computer-readable storage medium, the memory may store non-transient software programs, non-transient computer-executable programs and modules, such as the program instructions/modules corresponding to the method for filtering pulse signal motion interference according to the embodiments of the present disclosure. By running the non-transient software programs, instructions and modules stored in the memory, the processor executes various functional applications and data processing, i.e., implements the method for filtering pulse signal motion interference in the method embodiments.

The memory may include a program storage area and a data storage area, wherein the program storage area may store an operating system and an application program required by at least one function; the data storage area may store data created by the processor, etc. In addition, the memory may include a high-speed random-access memory and a non-transient memory, such as at least one disk memory device, a flash memory device, or any other non-transient solid-state memory device. In some embodiments, the memory may optionally include a remote memory with respect to the processor and connectable thereto through a network. Examples of the network include, but are not limited to, the Internet, an intranet, a local area network, a mobile communication network, and combinations thereof.

The one or more modules are stored in the memory, and perform the method for filtering pulse signal motion interference in the embodiments when executed by the processor.

In some embodiments of the present disclosure, the user device may include a processor, a memory, and a transceiver unit that may include a receiver and a transmitter. The processor, the memory, the receiver and the transmitter may be connected through a bus system, the memory is configured to store computer instructions, and the processor is configured to execute the computer instructions stored in the memory to control the transceiver unit to transmit and receive signals.

As an implementation, the functions of the receiver and the transmitter in the present disclosure may be realized by a transceiver circuit or a dedicated transceiver chip, and the processor may be implemented by a dedicated processing chip, a processing circuit or a general chip.

As another implementation, the server according to the embodiment of the present disclosure may be implemented by a general computer. That is, the program codes realizing the functions of the processor, the receiver and the transmitter are stored in the memory, and the general processor realizes the functions of the processor, the receiver and the transmitter by executing the codes in the memory.

The embodiments of the present disclosure further provide a computer-readable storage medium having a computer program stored thereon, and when executed by a processor, the computer program implements the aforementioned method for filtering pulse signal motion interference. The computer-readable storage medium may be a tangible storage medium, such as a random access memory (RAM), an internal memory, a read-only memory (ROM), an electrically programmable ROM, an electrically erasable programmable ROM, a register, a floppy disk, a hard disk, a removable storage disk, a CD-ROM, or any other form of storage medium known in the technical field.

Those of ordinary skill in the art will appreciate that the various exemplary components, systems, and methods described in conjunction with the embodiments disclosed herein can be implemented by hardware, software, or a combination thereof. The implementation mode depends on the specific application and design constraints of the technical solutions. Skilled persons can implement the described functions for each particular application using different methods, but such implementations should not be construed as going beyond the scope of the present disclosure. When the implementation is made by hardware, the hardware may be, for example, an electronic circuit, an application specific integrated circuit (ASIC), appropriate firmware, a plug-in, a function card, etc. When the implementation is made by software, the elements of the present disclosure are programs or code segments that are used to perform required tasks. A program or code segment may be stored in a machine-readable medium, or transmitted in a transmission medium or a communication link by a data signal carried in a carrier wave.

It should be noted that the present disclosure is not limited to the specific configurations and processes described above and illustrated in the drawings. The detailed descriptions of known methods are omitted here for the sake of brevity. In the above embodiments, several specific steps are described and illustrated as examples. However, the method process of the present disclosure is not limited to the specific steps described and illustrated, and various variations, modifications, additions, or changes in the order of the steps can be made by those skilled in the art after grasping the spirit of the present disclosure.

In the present disclosure, features described and/or illustrated for one embodiment can be used in the same way or in a similar way in one or more other embodiments, and/or combined with or substituted for features of other embodiments.

Those described above are merely preferred embodiments of the present disclosure, rather than limitations thereto. Various modifications and variations of the embodiments of the present disclosure will be apparent to those skilled in the art. Any modification, equivalent substitution, improvement, etc. made within the spirit and principle of the present disclosure should be included in the protection scope of the present disclosure.

The invention claimed is:

1. An apparatus for filtering pulse signal motion interference, comprising:
    a signal acquisition module configured to irradiate a skin of a target human body in motion with a green light source in real time, so as to acquire a corresponding pulse signal from the target human body in real time;
    a preprocessing module configured to preprocess the acquired pulse signal; and
    an interference filtering module configured to adaptively filter the preprocessed pulse signal based on acceleration data of the target human body acquired in real time, so as to filter out a motion artifact interference of the pulse signal;
    wherein, when adaptively filtering the preprocessed pulse signal based on the acceleration data of the target human body acquired in real time, the interference filtering module determines an estimated value of a blood volume change of the target human body due to motion, based on the acceleration data of the target human body acquired in real time, and subtracts the estimated value of the blood volume change from a value corresponding to the preprocessed pulse signal, so as to filter out the motion artifact interference of the pulse signal and obtain a corresponding target pulse signal; and
    wherein, when determining the estimated value of a blood volume change of the target human body due to motion, the interference filtering module inputs the value of the acceleration data into an adaptive filter to obtain an estimated tissue path, to determine an adaptive filter coefficient based on the obtained estimated tissue path, and obtaining the estimated value of the blood volume change based on a convolution of the determined adaptive filter coefficient with the acceleration data.

2. The apparatus for filtering pulse signal motion interference according to claim 1, wherein the signal acquisition module controls a PPG sensor to irradiate the skin of the target human body in motion with the green light source in real time, and acquiring a corresponding pulse signal in real time.

3. The apparatus for filtering pulse signal motion interference according to claim 1, when preprocessing the acquired pulse signal, the preprocessing module removes baseline data and high-frequency noise from the acquired pulse signal respectively.

4. The apparatus for filtering pulse signal motion interference according to claim 3, wherein, when removing the baseline data and the high-frequency noise from the acquired pulse signal respectively, the interference filtering module controls an infinite impulse response filter to perform high-pass filtering processing on the acquired pulse signal to remove the baseline data in the pulse signal, and performs low-pass filtering processing on the pulse signal to remove the high-frequency noise in the pulse signal.

5. A system for filtering pulse signal motion interference, comprising: a micro-control unit, and a PPG sensor, an infinite impulse response filter and an acceleration sensor which are in communication connections with the micro-control unit respectively;
    the micro-control unit is configured to: control the PPG sensor to irradiate a skin of a target human body in motion with a green light source in real time, so as to acquire a corresponding pulse signal from the target human body in real time, to preprocess the acquired pulse signal, and to adaptively filter the preprocessed pulse signal based on acceleration data of the target human body acquired in real time, so as to filter out a motion artifact interference of the pulse signal;
    wherein, when adaptively filtering the preprocessed pulse signal based on the acceleration data of the target human body acquired in real time, the micro-control unit determines an estimated value of a blood volume change of the target human body due to motion, based on the acceleration data of the target human body acquired in real time, and subtracts the estimated value of the blood volume change from a value corresponding to the preprocessed pulse signal, so as to filter out the motion artifact interference of the pulse signal and obtain a corresponding target pulse signal; and
    wherein, when determining the estimated value of a blood volume change of the target human body due to motion, the micro-control unit inputs the value of the acceleration data into an adaptive filter to obtain an estimated tissue path, to determine an adaptive filter coefficient based on the obtained estimated tissue path, and obtaining the estimated value of the blood volume change based on a convolution of the determined adaptive filter coefficient with the acceleration data.

6. The system for filtering pulse signal motion interference according to claim 5, wherein the micro-control unit controls the infinite impulse response filter to remove baseline data and high-frequency noise in the acquired pulse signal respectively.

7. The system for filtering pulse signal motion interference according to claim 5, wherein the micro-control unit controls the acceleration sensor to acquire acceleration data of the target human body in real time.

8. The system for filtering pulse signal motion interference according to claim 6, wherein the micro-control unit controls an infinite impulse response filter to perform high-pass filtering processing on the acquired pulse signal to remove the baseline data in the pulse signal, and perform low-pass filtering processing on the pulse signal to remove the high-frequency noise in the pulse signal.

* * * * *